J. GOOD.
ROTARY VALVE.
APPLICATION FILED FEB. 27, 1922.
Reissued Aug. 8, 1922. 15,430.
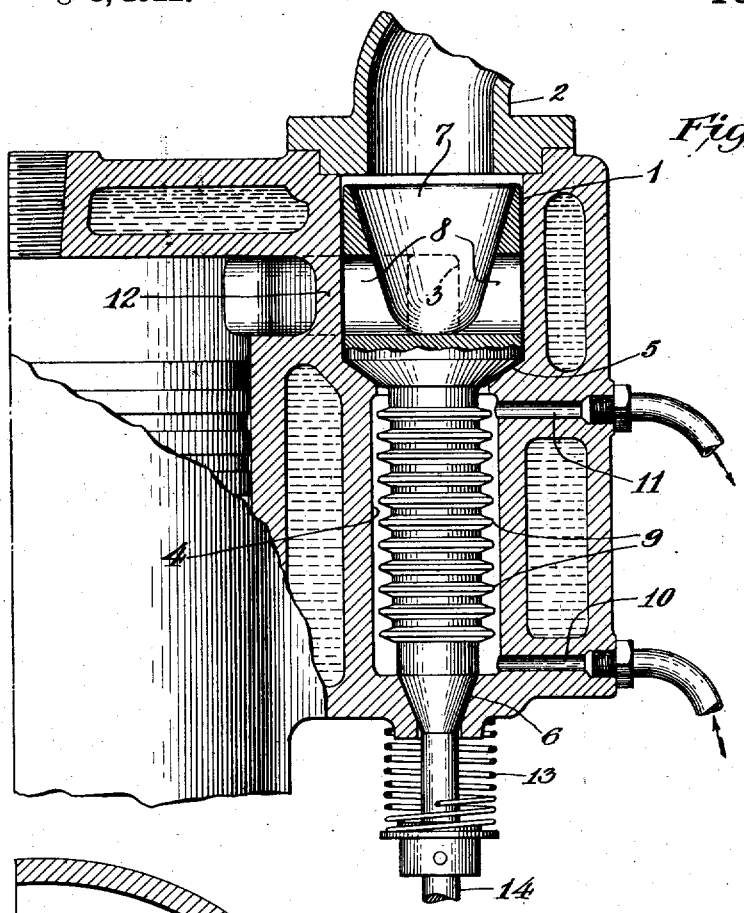
Fig. 1,
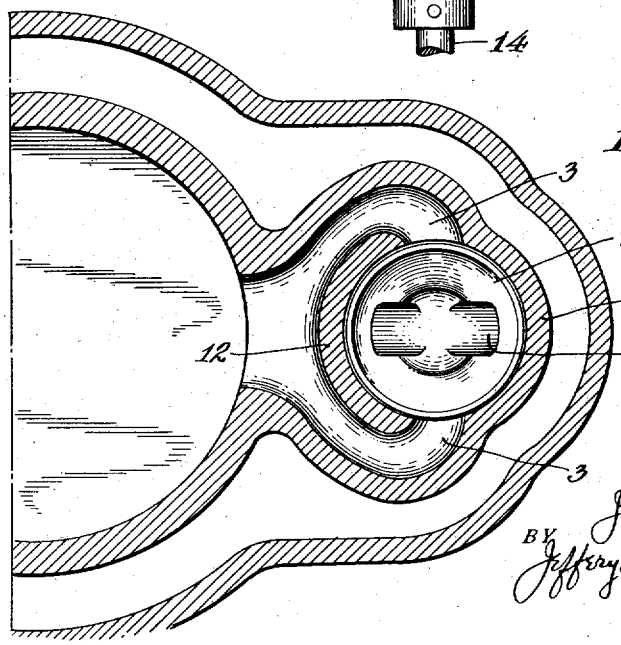
Fig. 2,
INVENTOR
John Good
BY Jeffery, Kimball & Egglston
ATTORNEYS

UNITED STATES PATENT OFFICE.

JOHN GOOD, OF GARDEN CITY, NEW YORK, ASSIGNOR TO GOOD INVENTIONS CO., OF BROOKLYN, NEW YORK, A CORPORATION OF NEW YORK.

ROTARY VALVE.

15,430. Specification of Reissued Letters Patent. Reissued Aug. 8, 1922.

Original No. 1,329,521, dated February 3, 1920, Serial No. 74,554, filed January 27, 1916. Application for reissue filed February 27, 1922. Serial No. 539,777.

*To all whom it may concern:*

Be it known that I, JOHN GOOD, a citizen of the United States, residing in Garden City, in the county of Nassau and State of New York, have invented the following described Improvements in Rotary Valves.

The invention is a rotary valve suited for controlling the severe pressures and temperatures encountered in internal combustion engines and capable of service at high efficiency in that relation, for at least the life of the other parts of the engine. The invention involves the separation of the sealing and seating functions of the valve structure and the provision for escape of heat from the parts exposed to flame, in such manner that the aforesaid results are produced, and also other features, all of which are hereinafter set forth and definitely pointed out in the claims.

In the accompanying drawings,

Figure 1 illustrates an axial section of a preferred form of the invention, taken for illustration of the principle thereof; and Fig. 2 a cross section on the line of the engine port.

These figures show the valve as it is preferably constructed when used to control a lateral outlet (or inlet) through the engine cylinder, being in this case parallel with said cylinder and housed in a water-jacketed extension therefrom, but it will be evident from the description which follows that the valve may be variously formed and applied to the engine in any of the various ways heretofore proposed for rotary valves.

The upper part of the water-jacketed valve casing forms a cylindrical cavity 1, connected at the top with a manifold 2, and provided with diametrically opposite ports 3 in its cylindrical wall, which are in communication with the engine cylinder, as indicated in Fig. 2. The lower part of the valve casing, marked 4, constitutes part of the heat-abstracting means presently described, being also surrounded by the water-jacket, as indicated. Between the upper and lower chambers, the casing is provided with a tapered or conical seat 5, and at the bottom of the lower chamber, with a similar tapered seat 6, and the rotary valve member, (inserted through the manifold opening) is provided with corresponding journal surfaces engaged jointly by the seats 5 and 6, and held thereby firmly and truly in concentric alinement with the chamber 1. The particular style and location of the journal and journal seat surfaces of the valve is not of consequence, so long as the concentric position of the valve member is securely retained and the effect of wear thereon is not effective to produce appreciable tendency toward disalinement. The cylindrical part 7, of the rotary valve member, which occupies the valve chamber 1, is hollow and open at the top, and also provided with ports 8, through which communication between the engine and manifold is established whenever the said ports register with the engine ports 3. The ported cylindrical surface of the part 7 occupies a position closely parallel to the opposing ported cylindrical surface of the chamber 1 but not in actual rubbing contact therewith, the intervening crevice being of such microscopic width as to constitute a seal to the engine port without pressure and hence without need of lubrication, a condition which may be achieved by giving the rotary member a diameter of about .004 inch less than that of the chamber 1, and preferably also by roughening or lightly threading one or both said surfaces to permit the formation of a face of hard carbon deposit, which still further narrows the crevice. The carbon deposits on the said surfaces from the engine gases and becomes permanently anchored thereto by virtue of the threading. The self-centering engagement between the valve member and its casing precludes relative movement between the said surfaces, except in the rotary direction, and they consequently maintain their initial closely proximate relation so long as displacement from wear of the valve structure is controlled to take effect only on the rotary axis of the valve, i. e., parallel with the said port-sealing surfaces. It will be noted that the port-sealing effect is accomplished and maintained by dry-running surfaces in imperfect or pressureless contact with each other. That part of the rotary valve member which does not provide the said dry-running surface serves to support that surface and also to conduct away from it the heat constantly received from contact with the flame and heated gases, for which purpose the base of the valve is made of relatively massive proportions and of solid metal with large cross-sectional area, so as to form an ample path for heat conduction, and that part of the base which occupies the chamber 4 is ribbed (9) to give it an extended heat-radiating surface area for contact with a heat exchange medium contained in that chamber. The engagement of the valve member on its seats 5 and 6, isolates the chamber 4 from the dry-running surfaces and also closes the lower end thereof and thereby adapts the said chamber 4 to be interposed in the circuit of a liquid-cooling system, for which intake and outlet ducts 10 and 11 are provided. The liquid heat-exchange medium which is preferably oil and hence a lubricant for the adjacent journal seats, circulates through the casing and over the heat-radiating ribs, taking up the heat therefrom and either carrying it off to a heat dissipator at some other point (not shown) or else transferring it immediately to the surrounding water-jacket, which similarly disposes of it. The removal of heat from the rotary valve member is thereby accomplished at a rate sufficient to keep its dry-running part 7 at a relatively low and safe temperature, notwithstanding that it has no opportunity of discharging heat into the water-jacket surrounding it, on account of the intervening gas film. The walls of the said part are tapered and thicker toward the base, so that a metallic heat path of progressively enlarging cross-sectional area is thereby produced from the extreme upper end of the member to its cooled base, thus not only providing an unrestrictive conductive path but also a low temperature gradient in the valve member as a whole. The low temperature and low temperature gradient avoid excessive and non-uniform thermal expansion of the valve member, so that any change in form it may undergo as the result of such thermal rise that it is capable of, is substantially commensurate with the corresponding thermal change of the casing, thus insuring continued accurate fitting of the two parts at all temperatures assumed. The casing wall 12, which happens to be subjected to high temperatures on all sides, is preserved cool by reason of its tapered and widened junctions with the water-cooled walls at its top and bottom, as indicated in Fig. 1. The heat at the vertical center of this wall finds a progressively increasing cross-sectional area for escape to the water-jacket, much in the same way as the heat absorbed by the upper part of the wall 7 passes to the lower cooled part of the valve member.

The arrangement of ports in the valve and casing is manifestly subject to control according to preference but it is desirable that the engine pressure shall balance on the valve and that all sources of lateral pressure be avoided, or at least minimized, so far as possible in order that sidewise wear may not appreciably displace the valve member and disturb the port-sealing function of the dry-running surfaces. For this reason the engine ports 3 are disposed on opposite sides of the valve member; and in order that even the symmetrical wear on the valve shall be reduced in extent, the ports are preferably so designed as not to subject the valve to the engine pressure in the direction to thrust it upon its seat or seats. Various port designs will accomplish this object and need not be here explained, the port arrangement shown being one of them, and in which it is sufficient and practicable to hold the valve to its seat by spring pressure, such as indicated at 13. The valve will of course be understood to be driven from the engine crank-shaft and in proper phase therewith, according to the port design, and through any suitable valve gearing. Preferably such gearing should avoid, so far as possible, any lateral thrust on the valve, for reasons already indicated. Such results may be accomplished by making the valve stem 14 long or slender and hence relatively flexible, or by means of any of the well known floating drive contrivances.

It will be understood that while I have shown and illustrated the valve as adapted to utilize a circulating mass of oil as the heat-abstracting or heat-exchanging means any other kind of cooling agent could also be employed, for instance, the cooling water of the water-jacket could be passed over the ribs 9, in such case observing the necessary precautions to prevent deterioration from rust and scale. The oil system is preferred, for obvious reasons, and because it is cooled by the water-jacket water even while in contact with the heat-radiating surface of the valve member.

From the foregoing it will be observed that the substance of the invention resides in the means for establishing and maintaining the ported surfaces of valve and casing in port-sealing but pressureless and hence non-wearing contact, combined with means for simultaneously and adequately withdrawing the heat which would otherwise accumulate in the flame exposed part of the rotary member and produce an excessive temperature therein and throughout the whole of the valve member, injurious not only to the metal itself but fatal to efficient service. The efficiency of the valve is initially high and is maintained so by avoiding tendency to lateral displacement or disalinement of the valve member from seat wear, which would of course disturb the pressureless, port-sealing action.

I claim:

1. A rotary valve for internal combustion engines, comprising a casing, a rotary valve member seated endwise thereon upon an axially tapered seat and provided with a dry-running, ported surface separate from said seat and closely opposed to a corresponding ported surface of said casing and co-acting therewith to seal the valve, a heat-exchanging medium and means whereby said medium is caused to flow in contact with said rotary valve member to abstract heat from its said dry-running surface and maintain the valve at proper working temperature.

2. A rotary valve for combustion engines, comprising a casing, a rotary valve member seated endwise thereon upon a self-centering axially-thrusting seat and having a dry-running ported surface separate from said seat and closely opposed to a corresponding ported surface of said casing and co-acting therewith to seal the valve, a heat-exchange space also separate from said seat, and a heat-exchange medium in contact with said valve member in said space and adapted to abstract heat from its said dry-running ported surface.

3. A rotary valve for combustion engines, comprising a casing and rotary valve member, respectively, provided with supporting seat surfaces and also with opposing parallel ported surfaces which are in imperfect, substantially pressureless contact with each other and adapted to seal the valve without lubrication, said member having relatively massive proportions and thereby having an ample heat conduction path from its port surface to its base portion, the seat surfaces on said parts serving to maintain the said imperfect contact and port-sealing relation notwithstanding the wear on said seat surfaces, and means cooperating with said valve member at points thereof separated from these seat surfaces for abstracting heat from said base portion, whereby the valve member preserves a low working temperature.

4. A rotary valve for internal combustion engines, comprising a casing and rotary valve member provided with opposing, closely parallel, dry-running, ported surfaces adapted to seal the valve without lubrication, supporting seat surfaces on said member and casing subject to displacement from wear only in the direction of said parallel dry-running surfaces, and a liquid heat-exchange medium circulating in contact with said valve member, adjacent to its seat surface to rapidly abstract heat from its dry-running surface.

5. A rotary valve for internal combustion engines, comprising a casing and a solid metal rotary valve member, provided respectively with closely parallel, dry-running, ported surfaces adapted to seal the valve without lubrication, said rotary member having a part separate from said dry-running part and cooled by a liquid heat-exchange medium in contact with the exterior thereof and thereby serving to maintain a low temperature therein.

6. A rotary valve for combustion engines, comprising a casing including two chambers isolated from each other, a rotary metallic valve member therein, having a port-sealing part in one chamber, and a heat-discharging part in the other chamber, and a circulatory heat-exchanging medium in said latter chamber adapted to maintain the whole of the valve member at a low working temperature.

7. A rotary valve for internal combustion engines comprising a casing, a rotary valve member provided with a dry-running ported surface closely opposed to a cooperating ported surface of said casing and also provided with a seating surface removed from said ported surface, and means providing for the flow of a cooling fluid in contact with said valve other than over said seating surface.

8. A rotary valve for combustion engines comprising a casing and a rotary valve member therein, said casing and member being provided with opposed, parallel dry-running, ported-surfaces concentric to the rotary axis and closely related to each other in pressureless and frictionless contact whereby said surfaces seal the port passage without the presence of lubricant, and self-centering, endwise-seating journal means for said rotary member adapted to maintain the surfaces in said relation and comprising two bearings spaced apart in the direction of the rotary axis and arranged so that displacement of said valve member, as the effect of wear, occurs principally in the direction of said axis.

In testimony whereof, I have signed the specification.

JOHN GOOD.